United States Patent Office 3,408,992
Patented Nov. 5, 1968

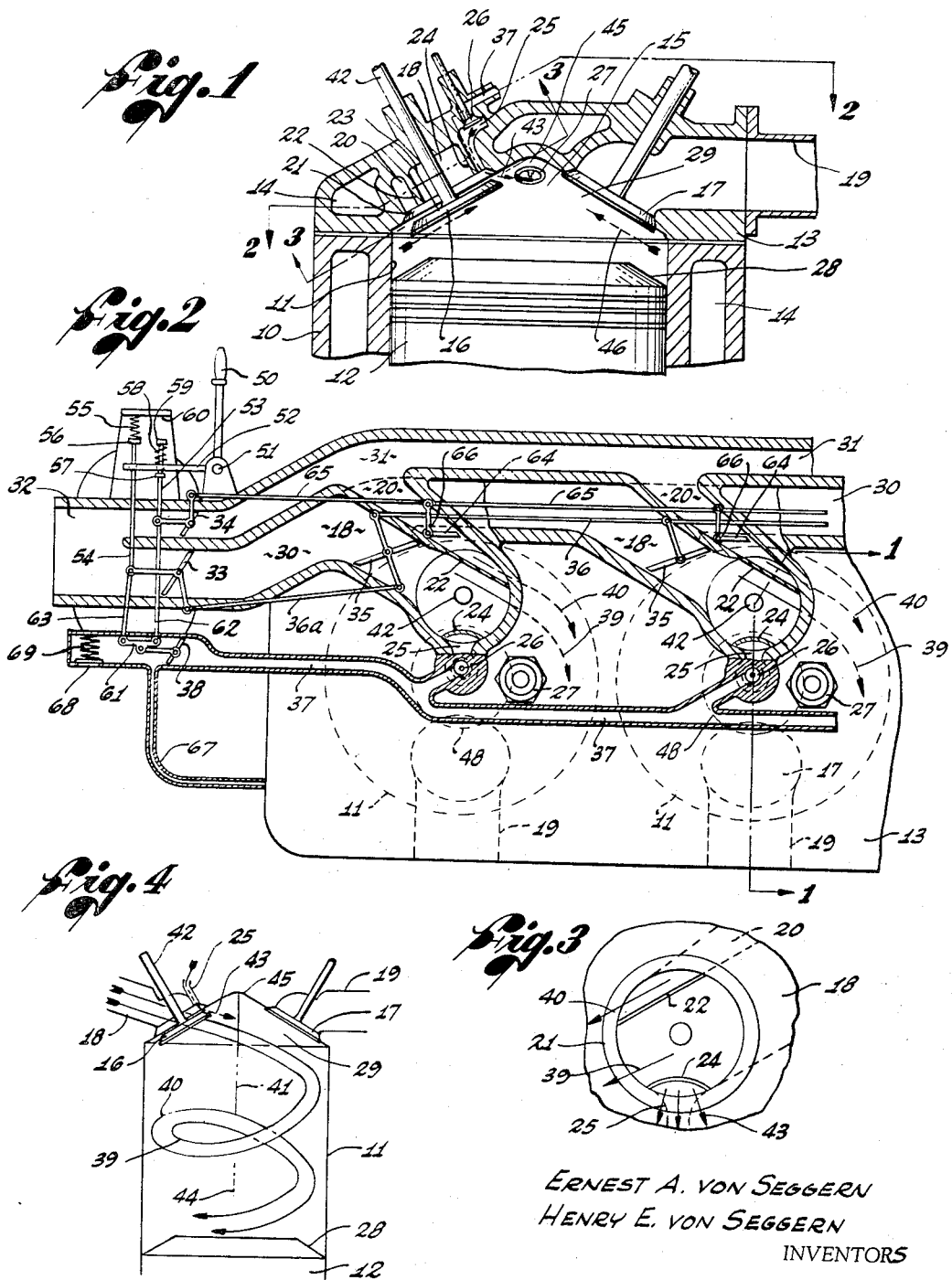

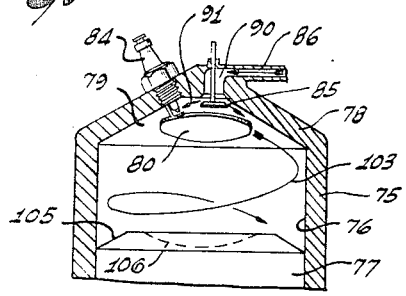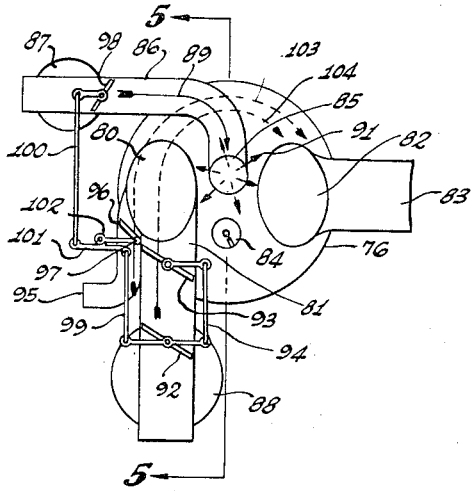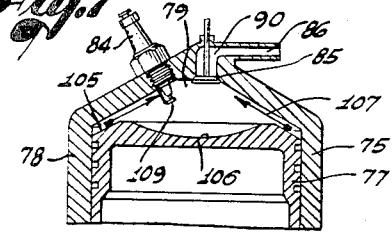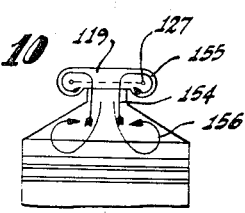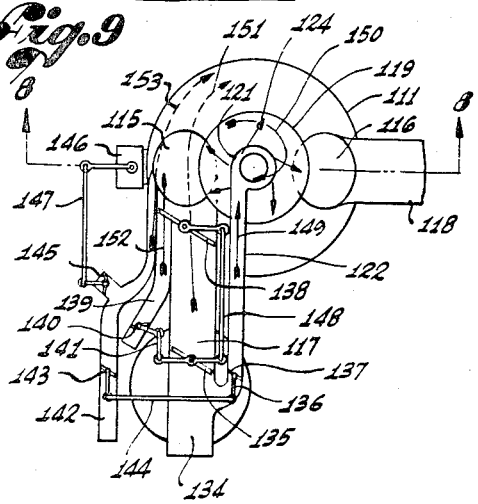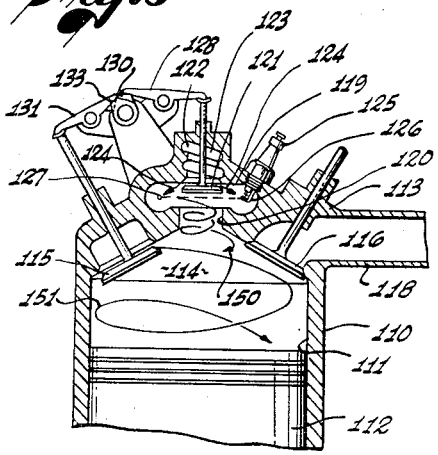
ERNEST A. VON SEGGERN
HENRY E. VON SEGGERN
INVENTORS

3,408,992
INTERNAL COMBUSTION ENGINE AND PROCESS UTILIZING HEATED AUXILIARY AIR TO OBTAIN COMPLETE COMBUSTION
Ernest A. Von Seggern, 1051 E. Angeleno, Burbank, Calif. 91501, and Henry E. Von Seggern, Rte. 2, Box 1910, Escondido, Calif. 92025
Continuation-in-part of applications Ser. No. 369,091, May 21, 1964; Ser. No. 398,219, Sept. 22, 1964; Ser. No. 494,653, Oct. 11, 1965; and Ser. No. 553,425, May 27, 1966. This application Dec. 13, 1966, Ser. No. 601,480
8 Claims. (Cl. 123—75)

ABSTRACT OF THE DISCLOSURE

An engine of the spark ignition type, with throttle and carbureted fuel supply, is provided in which a fuel-air mixture of substantially stoichiometric proportions and auxiliary air are held separately in the engine in stratified and adjoining relationship from the time of induction until at least the time of ignition. The fuel mixture is also stratified with respect to residual exhaust gases. Means for obtaining and maintaining stratification include: variable flow restricting and velocity increasing means in the induction system in close proximity to the intake valve; flow directing means to produce an organized circulation of either the fuel-air mixture or the auxiliary air about the length axis of the cylinder during the intake and compression cycles; and means for introducing the auxiliary air or the fuel-air mixture substantially along the axis of circulation of the other body. Several alternate configurations are shown.

---

This application is a continuation-in-part of our prior co-pending applications, as follows: Ser. No. 369,091, filed May 21, 1964, entitled "Internal Combustion Engine Process and Apparatus Using Toroidal Ignition Chamber" now abandoned; Ser. No. 398,219, filed Sept. 22, 1964, entitled "Mixture Separation Means and Fuel Supply Means for Excess Air Cycle Engine" now abandoned; Ser. No. 494,653, filed Oct. 11, 1965, entitled "Supply and Separation Method and Means for Fuel-Air Mixtures for Internal Combustion Engines" now abandoned; and Ser. No. 553,425, filed May 27, 1966, entitled "Internal Combustion Engine and Process Utilizing Excess Air," now abandoned, and others referred to therein.

This invention relates to an internal combustion engine and process of the class in which heated auxiliary air is added to the combustion during the time of substantially maximum temperature and pressure in the engine cycle in order to obtain a complete and clean combustion. More specifically, it relates to a spark ignition engine of the class which operates with working fluids consisting of pre-mixed fuel-air mixtures and auxiliary air in stratified relationship in the combustion chamber, and controls power output by varying the density of the working fluid.

It is a general object of this invention to provide a method of combustion and an improved engine in which auxiliary air may be utilized in an improved manner to complete the combustion and improve the thermal efficiency of the engine. A further object is to provide an engine and a method of combustion which maintains substantially equal cleanliness under all types of operation, such as acceleration, deceleration, variable load and speed. A further object is to provide such an engine which has operating characteristics equal to or better than conventional engines, such as response to load variation and specific output. It is also an object of the invention to provide means which make it possible to achieve the stated results, such as cylindrical and toroidal flow patterns for stratifying fuel and air charges in the cylinder and combustion chamber, means for preventing intermixiture of residual exhaust gases with the fuel charge in the intake manifold, means for maintaining a substantially uniform velocity of the working fluid in the cylinder during the part-load, throttled operation as well as full-load operation, and means to coordinate the quantity of auxiliary air added with engine speed and load.

Additional objects and features of the board invention as well as special objects and features will be described in the specification in conjunction with the description of the various specific illustrative embodiments of the broad invention.

It has long been an objective, in the operation of internal combustion engines, and particularly in gasoline engines, to improve the combustion by simply providing an excess of air in the cylinder with the fuel. The desired results are not so easily achieved. Air is 4/5 nitrogen (which is substantially inert), and acts primarily as a diluent and coolant, which impedes combustion rather than assists it. The initial combustion in a conventional spark-ignition engine is easy to obtain. But as the reaction proceeds, the last fuel to burn is diluted more and more with the products of the combustion just completed, so that the mixture becomes greatly diluted with $CO_2$, $H_2O$ and $N_2$. This dilution impedes the reaction, but when excess air is mixed into the working fluid, the dilution becomes even greater. Too much excess air can give as bad results as not enough, although in a different way.

The combustion can, however, be completed, provided the mixture is properly prepared, and the air is added at the proper time, in proper amount, and at a high temperature.

Operating conditions which contribute to obtaining complete combustion according to the invention are as follows:

(1) The fuel mixture having substantially stoichiometric proportion of fuel and air must be uncontaminated by residual "exhaust gases," i.e., products of combustion, in order to obtain a fast combustion therefrom.

(2) The auxiliary air must be kept separate from the fuel mixture prior to combustion.

(3) The air, while still unmixed, must be heated by the initial combustion of the fuel mixture, while the piston is near T.D.C., and then be quickly mixed with the burning mixture when the temperature of both are near a maximum. There should be an excess of air, but only about 4% excess $O_2$ is required. The entire reaction should be substantially completed before expansion of the charge on the power stroke.

Operating condition No. 1 is met by providing auxiliary restrictive means in the intake manifold of the engine in close proximity to the intake valve, to restrict the manifold at part-load operation and thereby impede the entry of residual exhaust gases into the intake manifold when the intake valve first opens, and also by providing means for introducing the working fluid into the cylinder at high velocity during idle and part-load operation in order to establish a circulation pattern in the cylinder.

Operating condition No. 2 is met by establishing an axial circulation in the cylinder, which may take several forms, but in which usually the fuel mixture circulates against the periphery of said cylinder with the residual exhaust gas along the central axis near the end of the cylinder opposite the combustion chamber, and the auxiliary air along the central axis near the combustion chamber.

Operating condition No. 3 is met in several steps. The air and fuel mixture are first heated in the manifold by conventional means, such as exhaust heat or hot water prior to entry into the cylinder, then heated further by compression in the cylinder, and finally by heat from the combustion of the initial portion of the fuel charge.

In the accompanying drawings, showing somewhat diagrammatically typical embodiments of the broad invention:

FIGURE 1 is a vertical cross-section of a preferred form of multiple cylinder engine having a hemispherical combustion chamber with inclined values (dual intake manifold not shown), taken along the line 1—1 in FIGURE 2;

FIGURE 2 is a plan view of the engine shown in FIGURE 1, showing the fuel supply, dual manifold, and air control system, taken along the lines 2—2 of FIGURE 1;

FIGURE 3 is a view of the intake valve seat and triple manifolds shown with the intake valve removed and along the line 3—3 of FIGURE 1;

FIGURE 4 is a diagrammatic view of the cylinder and head showing flow of fuel mixtures and air into the cylinder;

FIGURE 5 is a vertical cross-section of an alternate form of the invention shown as a single cylinder engine using three valves in the cylinder head and with the position of the fuel mixture and air interchanged, the view being a section taken along the line 5—5 of FIGURE 6;

FIGURE 6 is a diagrammatic plan view of the engine shown in FIGURE 5;

FIGURE 7 is a vertical cross-section of the engine shown in FIGURE 5 with the piston near to the end of the compression stroke;

FIGURE 8 is a vertical cross-section of a second alternate form of the invention shown as a single cylinder engine having two valves in the cylinder head and a coaxial, toroidal type ignition chamber with a third fuel admission valve therein, the view being a section taken along the line 8—8 of FIGURE 9;

FIGURE 9 is a diagrammatic plan view of the engine shown in FIGURE 8; and

FIGURE 10 is a diagrammatic vertical section of the engine shown in FIGURE 8, showing the flow of working fluid into and out of the ignition chamber.

The engine shown in FIGURES 1, 2, 3, and 4 is a substantially conventional four-cycle gasoline engine having a hemispherical combustion chamber with inclined intake and exhaust valves. It is shown with two cylinders of a multiple cylinder engine and shows a typical branched intake manifold and fuel supply system.

A cylinder block 10, having a cylinder bore 11 with reciprocating piston 12 therein, has a cylinder head 13 fastened onto the upper end thereof. A water jacket 14 is shown, but any conventional air or liquid cooling means may be used. A combustion chamber 15 of substantially hemispherical design is formed in head 13, which also includes valve seats for a conventional intake valve 16 and exhaust valve 17. These valves are operated in the conventional manner by the usual means (not shown). A large intake manifold 18 leads to the seat controlled by valve 16 and exhaust manifold 19 leads from the seat controlled by valve 17. There is also a small intake manifold 20 which is shown parallel to manifold 18, and is separated therefrom except near the intake valve 16. The manner in which the two manifolds terminate at the valve seat 21 is shown in FIGURE 3 which shows the seat with the intake valve removed.

The dividing wall 22 of the two manifolds lies across the circular opening of the valve seat 21 like a chord and terminates immediately above the back side 23 of the intake valve 16. Substantially opposite wall 22 is another and small dividing wall 24 which also extends across the cylinder opening and may also be like a chord, though shown curved to illustrate variations in design. This wall also terminates immediately above the back side 23 of valve 16 (when said valve is closed), and extends away from said valve to form a passage 25. Said passage leads to a third valve 26 which may conveniently be of the poppet type, similar to valve 16, but smaller, and positioned parallel and close thereto, in order that it may be opened and closed in synchronism with valve 16 and by the same actuating mechanism (not shown).

A spark plug 27 extends into the combustion chamber 15 at a point slightly off the center line of the cylinder, to provide space for large intake and exhaust valves. The piston 12 is shown with a beveled head 28 which, in combination with the hemispherical cavity 29 in head 13, produces a peripheral squish zone in the combustion chamber 15. This is not close fitting, however, which would produce a quench zone, but is quite open, it being possible to operate satisfactorily with a conventional flat top piston if desired.

The discharge ends of intake manifolds 18 and 20 are positioned tangentially with respect to the cylinder 11, as shown in FIGURE 2, and the end of third passage 25 is positioned substantially adjacent the central axis of said cylinder. In a multiple cylinder engine, the individual passages 18 and 20 for each cylinder are joined into manifolds 30 and 31, respectively, in the conventional manner, with preferably not more than six cylinders joined to a single passage. The engine is shown with two cylinders of a four (or six) cylinder engine, and manifolds 30 and 31 are connected to a "two-barrel" carburetor 32 which has independent throttles 33 and 34. These throttles will be opened in a manner to be described, which is not conventional. In an eight cylinder engine, the carburetor would be made in the form of a "four-barrel" type with dual throttles for dual large and small intake manifolds.

Individual auxiliary throttles 35 are placed in each branch manifold passage 18 at a point in close proximity to the intake valves 16 and are all connected together by rods 36 and to the large throttle 33 by a rod 36a so that they all open and close together.

The individual passages 25 are also connected into a common manifold 37 beyond the valve 26, and are branched in a manner analogous to the manifolds 30 and 31. An air control valve 38 is placed at the inlet end of manifold 37 and is coordinated in its operation with throttles 33 and 34 in a manner to be described.

In operation at full load, the engine operates substantially as a standard gasoline engine, except that some auxiliary air is also admitted to the cylinder. During the intake cycle throttles 33 and 34 are both fully open, together with auxiliary throttles 35 and air control valve 38. Carburetor 32 supplies a substantially stoichiometric fuel-air mixture to manifolds 30 and 31, and thence to branch manifolds 18 and 20, respectively, which direct the mixture into the cylinder 11 through valve 16 in a dual spiral flow as indicated by arrows 39 and 40 in FIGURE 4. Simultaneously, air from manifold 37 passes down passage 25 in a direction substantially parallel to the valve stem 42 and impinges on the back side 23 of valve 16, from where it flows for the most part radially out toward the central axis 41 of the cylinder 11 in a flow 43. The cross-section of passage 25 is made larger than that of manifold 37 to insure that the air is diffused therein after passing valve 26, and enters the combustion chamber 15 at low velocity. This causes the air to collect on the upper end of said axis in the vicinity of the combustion chamber 15, while the residual exhaust gases in the cylinder are driven, by the combined action of the entering fuel mixture and the entering air, toward the lower end of said cylinder, and along said axis 41, in the region 44, as shown in FIGURE 4.

The relative position of the fuel mixture, the air, and the residual exhaust gases is substantially unchanged during the compression stroke because the motion of the piston along the axis of the cylinder does not destroy the circulation which is in a plane normal to the axis of the cylinder. Toward the end of the compression stroke, but before ignition occurs, the circulation pattern is modified due to the close approach of the piston 12 to the hemispherical cavity 29. The approach of the periphery of the piston to the hemispherical walls of the combustion chamber is closer than that of the central region and causes a squish action, which may be enhanced as much as desired, by beveling the outer portion 28 of the piston top as shown and fixing the clearance. The fuel mixture, which is circulating adjacent the cylinder wall 11 is displaced toward the upper central apex 45 of the combustion chamber in a converging flow as indicated by arrows 46 (shown as a flat projection of the spiral flow) while the air which had been stored in the region of the apex 45 of the combustion chamber is displaced downwardly from its initial position.

The spark plug 27 ignites the fuel mixture which, being substantially stoichiometric, burns rapidly and effectively to heat the air, before the air becomes mixed with the burning gases. The air is heated to the highest possible temperature before being mixed with the burning gases. It can then effectively promote the completion of the combustion, but has not also impeded its initial progress. Consequently, the whole burning process can be completed before the piston travels very far on the power stroke, and before the resulting expansion cools the reaction sufficiently to impede its completion. It is most important from both the standpoint of clean combustion and engine efficiency that the combustion be completed before the power stroke is well advanced.

In conventional engines which have throttles and operate with variable mixture density power control the increase in fuel mixture contamination by residual exhaust gases in the cylinder which occurs at part load greatly increases the problem of obtaining clean and efficient combustion under these conditions.

Exhaust gases impede combustion, even when hot, and every effort is accordingly made to minimize the mixing of exhaust gases with the new fuel mixture before and during the time the mixture is being burned. Mixing may occur first in the intake manifold, then secondly in the cylinder, and finally in the combustion chamber. Manifold mixing takes place when the intake valve opens after the exhaust stroke and the pressure in the combustion chamber is atmospheric while the pressure in the intake manifold is below atmospheric. This pressure difference is greatest during deceleration and idling, but is still appreciable at part-load. It is greatest in multiple cylinder engines which have a common manifold. The problem is also increased in high performance engines that have appreciable valve overlap, which makes it possible for exhaust gas to be drawn back from the exhaust pipe into the intake manifold during the time both valves are open.

Back flow of exhaust gases into the manifold can be prevented if the opening of the intake valve is delayed until the piston has traveled far enough down on the intake stroke to reduce the pressure in the cylinder to a value equal to or less than that in the manifold, but it is more practical to provide an auxiliary valve 35 in the intake manifold 18 in close proximity to the intake valve 16. This can be a check valve, which opens toward the cylinder, but it is sufficient, and simpler, to use a throttle as shown. The larger the volume of the intake manifold, the larger the volume of exhaust gases which can flow back into the manifold to equalize the pressure when the intake valve opens. Consequently, it is effective to divide the intake manifold into a large volume manifold 30 and a small volume manifold 31, and place the auxiliary throttle 35 in the large manifold. In this way, by closing throttle 35 completely at part-load and idle, only the small manifold is operative and this has the additional advantage that the velocity of the fuel mixture entering the cylinder, even under idling conditions, is sufficient to establish the circulation in the cylinder. Accordingly, at light load and idle, throttle 33 and auxiliary throttles 35 are completely closed. Power control is only by small throttle 34.

A typical mechanism for operating the engine is shown in FIGURE 2. Throttle lever 50 is pivoted at 51, and has an arm 52 which engages rods 53 and 54, which latter operate throttles 34 and 33, respectively. A spring 55 normally holds throttle 33 closed, together with all the auxiliary throttles 35. Arm 52 can compress the spring and open said throttles by moving up and engaging collar 56. Rod 53, on the other hand, passes through a hole in arm 52 and has a collar 57 below arm 52 and a spring 58 supported by collar 59 above said arm. When throttle 50 is moved to the right, its first action is to open throttle 34, by acting against spring 58 and moving rod 53 up. When throttle 34 is fully open, it is prevented from moving more by coming against a stop 60. At this point, arm 52 engages collar 56 and begins to open throttle 33 against spring 55, while at the same time compressing spring 58. At full load both throttles are fully open. Throttle 34 alone will produce about one-third of full power.

The auxiliary air admitted to the cylinder by throttle 38 is correlated to the throttle opening of carburetor 32, so that there is an excess of $O_2$ in the exhaust of about 4% at idle and 2 or 3% at full load. Larger quantities of excess air may, however, be admitted to the engine to insure that adequate air be present to compensate for abnormal conditions, such as carburetors adjusted too rich, excess fuel collected in cold manifolds and discharged into the engine during sudden load variations, and general deterioration of the engine due to age and wear causing excessive oil consumption. This insures a clean combustion even though the engine is in need of a tune-up or repairs. The air control is accomplished by means of the mechanism shown in FIGURE 2. Throttle 38 is actuated by means of a center pivoted bar 61, having a rod 62 connected to throttle 34 and a rod 63 connected to throttle 33. It will be seen that opening throttle 34 will also open air valve 38 somewhat and that thereafter, the opening of throttle 33 will open air valve 38 still further, to admit as much air as required.

In a multiple cylinder engine having more than one cylinder connected to a common manifold, the air manifold and fuel mixture manifold must be kept separated. The air valves 26 are provided at the discharge ends of the air manifold for this reason. They open with the corresponding intake valve 16 for a given cylinder so that air can enter the fuel mixture manifold only when the fuel mixture in the manifold is entering the cylinder. In addition, only four, or at the most, six cylinders are connected to a single manifold to insure that there is no valve overlap. If this is not done, the air can enter the manifold and mix with the fuel mixture in the manifold, prior to its induction into the cylinder, forming a lean mixture. It will be evident that the action of valve 26 could be replaced by valve 16, if its back face 23 was ground to fit the open end of passage 25 accurately and closed said passage at the same time that said valve seated on intake valve seat 21.

The necessity for maintaining good mixture and residual gas and air separation in the cylinder at part-load is greater than at full load because the ratio of residual exhaust gas to fresh fuel mixture is greater at this time. The extreme condition is at idle and it is necessary that the small quantity of fuel mixture entering the cylinder have sufficient velocity to establish the pattern of circulation already described. For this reason the branch manifolds 20 are made small in cross-section and are positioned at the side of the intake valve 16 closest to the periphery of the cylinder. The cylinder pattern at part load and idle consists only of the outer flow 40 and the central air flow 43, with the residual exhaust gases at the lower and central part 44 of the cylinder, as shown in FIGURE 4. There is both an axial (with respect to the air) and a radial (with respect to the fuel mixture) separation of the exhaust gas and the active reagents.

If desired, an additional auxiliary throttle 64 may also be placed in the small manifold 20, and be connected by rods 65 to throttle 34 in a manner so as to open and close with said throttle. In addition, it may be mounted on an axis 66 at the side of manifold 20 nearest to valve 16 and be oriented so as to direct the mixture passing through said valve to flow with maximum velocity adjacent the walls of said cylinder even when the engine is idling. This valve also impedes the entry of residual exhaust gases into the manifold when the intake valve opens, especially under idle and deceleration when the pressure difference is a maximum and the quantity of fuel mixture entering the cylinder is a minimum.

Extending this design further, it is possible to enlarge manifold 20 and auxiliary valve 64 sufficiently to carry the full load fuel mixture and eliminate manifold 18 entirely. In this way, the desired mixture velocity can be maintained in a single manifold in place of the dual manifold.

The successful operation of the engine depends on the separation of the fuel mixture and the auxiliary air from its initial introduction into the engine until combustion is well established. It requires separation in the intake manifold, separation in the cylinder, and separation in the combustion chamber, and when these are properly coordinated, satisfactory operation is obtained.

It should be noted that the separation means are also effective in separating the fuel mixture from the residual products of combustion in the cylinder even when no auxiliary air is admitted. A substantial improvement in engine performance is obtained by this means alone without the use of auxiliary air. The improvement is due to both an increased rate of combustion and a very substantial suppression of detonation.

An additional function which may be combined with the auxiliary air supply manifold is a crankcase ventilating system which delivers crankcase vapors to the engine to be burned in the combustion chambers. A tube 67 may be joined to air manifold 37 at a point just ahead of air control valve 38 where the air enters. Vapors issuing from the tube will be taken into the engine without interfering with the fuel mixture supplied by the carburetor and sufficient air may be admitted to more than burn the vapors. A valve 68 lightly biased by a spring 69, or by gravity, may be placed at the air manifold inlet to restrict the air flow sufficiently to put a slight negative pressure in the crankcase to draw air through it to ventilate it, and carry away the vapors formed therein.

The engine shown in FIGURES 5, 6, and 7 is basically similar to the engine shown in FIGURES 1 and 2, but interchanges the position of the fuel and auxiliary air in the combustion chamber, and employs an additional valve in the cylinder head to admit the mixture. It is also shown as a single cylinder engine, but the modifications already described for multiple cylinder engines may be applied thereto.

A cylinder block 75 having a cylinder bore 76 with reciprocating piston 77 therein, has a cylinder head 78 fastened onto the upper end thereof. A hemispherical combustion chamber 79 is formed in head 78 which also includes intake valve 80, intake manifold 81, exhaust valve 82, and exhaust manifold 83. Said valves are operated in the conventional manner by means not shown.

Intake manifold 81 is arranged tangentially with respect to cylinder 76 as shown, and spark plug 84 is placed between the intake and exhaust valves near the axis of said cylinder. An auxiliary intake valve 85 which opens into the combustion chamber, is placed near said spark plug. An auxiliary intake manifold 86 leads to the seat controlled by said valve.

An auxiliary carburetor 87 is joined to said manifold 86, and a main carburetor 88 is joined to main intake manifold 81. Intake valves 80 and 85 are timed to open and close together, and during the intake stroke, a fuel mixture from carburetor 87 flows through manifold 86 as shown by flow line 89. The manifold has a large cross-section 90 immediately above the valve 85 which reduces the velocity of the mixture as it enters the combustion chamber radially as shown by arrows 91. This places the fuel charge near the top and center of the combustion chamber, and with a very small axial component of velocity.

Carburetor 88 has a throttle 92 and an auxiliary throttle 93 is provided in manifold 81 in close proximity to intake valve 80 to control the back flow of exhaust gases into the manifold. Throttles 92 and 93 are connected by means of rod 94 and open and close together. An air passage 95 close to manifold 81, but adjacent the periphery of said cylinder and tngential thereto, has an air flow control valve 96, pivoted at 97, near the outlet into said cylinder. Both air passage 95 and manifold 81 open into cylinder 76 through the single intake valve 80.

The basic method of operation is the same as in the engine shown in FIGURES 1 and 2. Initial power is obtained by opening throttle 98 only, and thereafter additional power is obtained by opening throttle 92 while throttle 98 remains open. Both throttles are connected to air valve 96 by means of rods 99 and 100 and a bar 101 centrally pivoted at 102, which operates said air valve, and admits air in proportion to the combined throttle opening. During the intake stroke, a substantial stoichiometric fuel-air mixture from carburetor 87 is supplied to the top, central zone of the combustion chamber 79 as indicated by arrows 91. Simultaneously, air, as indicated by arrow 103, flows around the periphery of said cylinder, and any fuel admitted from carburetor 88 flows parallel thereto in an inner stream 104.

Near the end of the compression stroke, the air is circulating near the periphery of the cylinder, the fuel mixture from the auxiliary carburetor 87 is in the top central zone of the combustion chamber, any mixture from carburetor 88 is in an inner peripheral zone, indicated by flow line 104, and the residual exhaust gases are in the lower central region above the piston. The piston 77, as shown in FIGURE 7, has a beveled outer edge 105 which registers with the hemispherical combustion chamber to form a mild peripheral squish area, and a concave central area 106. The piston induces a circulation as indicated by flow line 107 (which is shown as a flat projection of the converging spiral flow) which directs the air at the periphery of the cylinder to flow up and above the fuel mixture. The fuel mixture collects in the vicinity where the electrodes 109 of the long reach spark plug 84 are located. Ignition of the concentrated and uncontaminated fuel mixture produces a fast burning combustion which heats the air before it becomes mixed with the burning gases.

With a separate auxiliary intake valve 85 and a special valve timing, the auxiliary fuel mixture can be introduced into the cylinder later in the cycle than the air and main fuel mixture through the main intake valve 80. For high performance engines with a large valve overlap, the delayed opening of valve 85 can minimize exhaust gas contamination by introducing the fuel after cylinder and manifold pressures have more nearly equalized.

A third embodiment of the invention is shown in FIGURES 8, 9, and 10. This engine also has dual intake valves but in addition has a toroidal ignition chamber which provides the most positive and complete fuel charge separation from residuel exhaust gases and excess air.

A cylinder block 110 having a cylinder bore 111 with reciprocating piston 112 therein, has a cylinder head 113 fastened onto the upper end thereof. A combustion chamber 114 of substantially hemispherical design is formed in head 113, which also includes valve seats for a conventional intake valve 115 and exhaust valve 116. Intake manifold 117 leads to the seat controlled by valve 115 and exhaust manifold 118 leads from the seat controlled by valve 116.

A toroidal ignition chamber 119 is joined to the combustion chamber 114 by a short passage 120 located substantially on the axis of cylinder 111. The ignition chamber includes a valve seat for an auxiliary intake valve 121 and an auxiliary intake manifold 122 leads to said seat. Just above the seat, the manifold is formed in a spiral groove 123 and the manifold is arranged tangentially with respect to said groove as shown. By means of this configuration, gases flowing into said ignition chamber from said manifold are given an axial spin and enter tangentially through said valve 121 in a uniform cone-shaped stream as indicated by arrows 124. A spark plug 125 having electrodes 126 extending out to the axis 127 of the toroidal chamber is screwed into the side of said chamber.

Auxiliary intake valve 121 is operated by a conventional rocker arm 128 and cam 130, and the main intake valve 115 is operated by the rocker arm 131, and cam 133. Cams 130 and 133 are formed so as to open valve 115 somewhat before valve 116 closes, but to open valve 121 well after valve 116 closes. As already described in the engine shown in FIGURES 5 and 6, the normal valve overlap in high-performance engines enhances contamination of the fuel mixture by exhaust gases, and this timing helps keep exhaust gases from entering the auxiliary intake manifold. It replaces the auxiliary throttle sometimes employed in the auxiliary manifold.

The intake manifold 117 is arranged tangentially with respect to the cylinder as shown and a carburetor 134 having a throttle 135 supplies a substantially stoichiometric fuel-air mixture to said manifold. An auxiliary carburetor 136 also having a throttle 137 supplies a substantially stoichiometric fuel-air mixture to the manifold 122 independently of carburetor 134, although both carburetors may be combined into a single unit as shown.

An auxiliary throttle 138 is provided in manifold 117 at a point adjacent said intake valve 115, and an air passage 139 is placed on the carburetor side of said throttle as shown. When throttle 138 is closed, this air passage is also closed with respect to the cylinder. An air flow control valve 140 is provided in air passage 139 and is connected by rod 141 to throttle 135 in a manner so they open and close together. A second air passage 142 of relatively small cross-section is located essentially parallel to said manifold 117 and opens into the manifold between the auxiliary throttle 138 and the intake valve 115. It has a first air flow control valve 143 which is connected to throttle 137 by a rod 144 which is arranged to open and close said valve and throttle simultaneously. A second air flow control valve 145 is also provided in parallel with said first valve and it is operated by engine speed responsive means, such as the centrifugal governor mechanism 146 as shown, and acting through rod 147. Other speed-responsive means such a diaphragms responsive to manifold pressure may also be used. The throttle 135 and the auxiliary throttle 138 are also connected by a rod 148 in a manner so said throttles open and close together. Finally, throttles 135 and 137 are so coordinated by means (not shown) but equivalent to those shown in FIGURES 1 and 2, which hold throttle 135 shut while throttle 137 controls the engine speed from idle to about one-quarter or one-third full load, and then open throttle 135, while throttle 137 is held open, to vary the power from one-quarter or one-third load to full load.

The basic mode of operation of this engine is similar to that of the engine shown in FIGURES 5, 6, and 7, except that an ignition chamber is employed and the auxiliary air control is more closely matched to the optimum requirements. At full load, all air valves and carburetor throttles are open and full charge of fuel-air mixture is taken into the cylinder during the intake cycle. The mixture from carburetor 136 flows in a stream 149 through manifold 122 and fans out from under valve 121 as shown by arrows 124 due to spin imparted to the mixture by passage through the spiral groove 123. The mixture then flows in a stream 150 around the peripheral region of the toroidal chamber 119 and spirals inwardly to flow out of passage 120 still in a spin, as shown, radially into the top of the combustion chamber 114 and with a minimum downward component of velocity. The charge stays in the top of the cylinder. Simultaneously a fuel-air mixture from carburetor 134 flows in a stream 151 through manifold 117, through intake valve 115, and into cylinder 111 to circulate in a spiral path as shown. This circulation and that of the mixture flowing out of passage 120 circulates in the same hand. Auxiliary air, entering the cylinder through air passages 139 and 142, in streams 152 and 153, respectively, also circulates in the same hand and adjacent the cylinder wall.

During the compression cycle, most of the fuel mixture and auxiliary air is compressed into the combustion chamber 114, but a proportionate quantity is also compressed into the ignition chamber 119. The inward flow 154 into the ignition chamber shown in FIGURE 10 induces a toroidal circulation 155 therein about the axis 127 of said toroid, which acts to concentrate the fuel mixture along said axis, while auxiliary air and some fuel mixture circulate around it.

The substantially uncontaminated ignition charge is then ignited by spark plug 125, and the expanding flaming gases induce a second toroidal circulation in chamber 114 as shown by lines 156. This picks up the remaining auxiliary air which has been localized near the periphery of said combustion chamber, and mixes it with the burning gases after combustion has been well initiated. Thus, the total combustion takes place in two stages, first in the ignition chamber, and secondly in the combustion chamber, the latter being induced by the former. Each combustion is initiated in a substantially uncontaminated, stoichiometric fuel mixture, surrounded by auxiliary air, which is then heated by the combustion before being mixed with it.

At light load and idle operation throttles 135 and 138 are closed. The only fuel mixture supplied to the engine enters through valve 121 from carburetor 136. Auxiliary air supplied to the engine enters through the passage 142. Proper separation of air, residual exhaust gases, and fuel mixture can be obtained only if an axial circulation is initially established in the cylinder. This can be done only by means of the air and fuel mixture admitted, and since at idle in particular, and light load also, the quantity of air and fuel mixture admitted is quite small relative to the mass of residual exhaust gases present, a circulation can be induced only if the air and mixture admitted are directed in at high velocity. To this end, the air passage 142 is made small in cross-section and the air admitted can be controlled externally away from the valve 115, which is convenient. The spiral flow induced in the mixture by the groove 123 is also particularly effective in establishing a circulation in the cylinder, and in purging the ignition chamber of exhaust gases during the intake cycle. When the intake manifold 122 is made with a small cross-section and volume, the use therein of an auxiliary throttle analogous to throttle 138, may be dispensed with.

The quantity of air admitted when the engine is idling is such as to provide about a four percent excess of oxygen. When the engine is over-speeded at closed throttle, as is encountered in road vehicles when coasting, the mixture and auxiliary air balance is disturbed. A poorly designed carburetor tends to deliver a fuel-air mixture under over-speed conditions which is quite rich, and this can most easily be compensated for by supplying a larger quantity of auxiliary air at this time. On the other hand, even a well designed carburetor has difficulty at over-speed conditions because the charge delivered to the engine becomes smaller at high speed, relative to the fixed quantity of residual exhaust gas in the cylinder. Only by means of the best charge localizations and the addition of a relatively large quantity of auxiliary air to dilute the exhaust gas can good firing of the small charges be obtained under these conditions. A governor 146 (or equivalent means) is provided, which acts, by means of rod 147, to open valve 145 when engine speed is high, and to close this again when the engine returns to normal idle speed. When the idle charge is properly localized, the engine will start and idle without "chocking" and when supplied with the proper quantity of auxiliary air, can accelerate and decelerate without emission of objectionable unburned hydrocarbons or carbon monoxide.

Above about one-quarter load throttles 135 and 138, and air valve 140 are opened, to admit additional fuel mixture and auxiliary air. The air passage 139 directs the air in a stream 152 tangentially against the cylinder walls parallel to the air stream 153 supplied through small passage 142. The fuel mixture supplied by carburetor 134 circulates about the cylinder axis in a stream 151 inside said air. The auxiliary throttle 138 functions as before, to minimize backflow of residual exhaust gases into manifold 117 during operation at low manifold pressure (high vacuum).

It will be evident that many more combinations of the elements shown can be made than are illustrated herein. For example, the relative position of the fuel mixture and auxiliary air can be interchanged, with suitable relocation of the spark plug, and the separate features shown only on the specific embodiments herein may be applied to the ohers as well.

It is understood that the engines described are not limited to the precise structure shown and described, but also include such modifications as may be embraced within the scope of the appended claims.

We claim:

1. In the operation of an internal combustion engine of the type having a cylinder, piston, cylinder head, a combustion chamber therein substantially in the form of a figure of revolution about the axis of said cylinder, an intake valve communicating with said cylinder, and an intake manifold communicating with said cylinder through said intake valve, and which operates with variable density working fluid power control and utilizes a working fluid consisting of at least two distinct bodies of which one is a combustible fuel-air mixture and the other consists of different gases, the method of establishing and maintaining stratification of said distinct bodies of working fluid in said cylinder at variable density operation which includes as steps: directing at least one of said distinct bodies of working fluid into said cylinder through said intake manifold and said intake valve at relatively high velocity in a substantially tangential flow line relative to said cylinder, whereby said body of working fluid circulates about the central length axis of said cylinders; directing the other of said bodies of working fluid to a position in said cylinder substantially co-axial with said one body of circulating working fluid, in an adjacent but separate position in said cylinder; and variably restricting the flow of said one body of working fluid through said manifold at a point in close proximity to said intake valve to maintain a realtively high velocity of flow through said valve and into said cylinder to effectively maintain said axial circulation at variable values of working fluid density.

2. A method of operation as in claim 1 which includes as steps: individually throttling said two distinct bodies variably restrict said manifold and thereby vary the density thereof; and coordinating said throttling of said bodies of working fluid to control the quantity of said distinct bodies of working fluid relative to each other at all values of density.

3. In an internal combustion engine of the type having a cylinder and piston, an intake valve in communication with said cylinder to admit working fluid to said cylinder, and an intake manifold in communication with said cylinder through said valve, and which operates with two distinct bodies of working fluid in stratified relationship in said cylinder, of which one body is a combustible fuel-air mixture and the other body consists of other gases, the combination of: flow directing means in combination with said intake manifold to direct one of said bodies of working fluid from said manifold tangentially into said cylinder to circulate therein about the central length axis thereof; additional manifold means in communication with said cylinder; additional flow directing means in combination with said additional manifold means to direct the other of said distinct bodies of working fluid into said cylinder in a position substantially co-axial with and adjacent to but separate from said one body of circulating working fluid; flow throttling means for each of said manifold means to vary the density of said distinct bodies of working fluid delivered to said cylinder to vary the power of said engine; flow control means in said intake manifold in close proximity to said intake valve to variably restrict said manifold and -thereby vary the velocity of said working fluid entering said cylinder through said intake valve; and control means to coordinate said flow control means with said throttling means to increase the restriction of said manifold when said flow throttling means are being closed, and vice versa, whereby the velocity of said one of said bodies of working fluid entering said cylinder through said intake valve and circulating about said axis is maintained relatively high as said throttles are opened and closed.

4. An apparatus as in claim 3 which includes the combination of: a partition in said intake manifold in close proximity to said intake valve, dividing said manifold substantially unequally into a dual manifold having a passage of relatively large cross-section and of small cross-section, with said passage of small cross-section nearest the periphery of said cylinder and positioned substantially tangential thereto; and said flow control means positioned in said manifold passage of relatively large cross-section, whereby all flow through said intake valve into said cylinder passes through said passage of small cross-section at relatively high velocity when said flow control means is closed in said passage of large cross-section.

5. An apparatus as in claim 4 which includes the combination of: additional flow control means in said manifold passage of small cross-section in close proximity to said intake valve to variably restrict said passage and independent of said flow control means in said passage of large cross-section; and control means to variably close said additional flow control means in said passage of small cross-section, after the closing of said flow control means in said passage of large cross-section.

6. An apparatus as in claim 4 which includes the combination of: a second partition in said intake manifold in close proximity to said intake valve dividing said manifold into an additional, third passage of relatively small cross-section, with said third passage positioned nearest the central length axis of said cylinder and communicating with said additional manifold means for supplying said other of said distinct bodies of working fluid to said cylinder; and flow directing means in corodination with said third passage for directing said working fluid toward said axis of said cylinder.

7. An apparatus as in claim 6 which includes the combination of: gas diffusion means in combination with said third passage to diffuse said other of said bodies of working fluid prior to the introduction of said working fluid into said cylinder.

8. In an internal combustion engine of the type having a cylinder and piston and intake manifold means in combination with intake valve means comprising at least one intake valve, to admit working fluid to said cylinder, and which operates with two distinct bodies of working fluid, of which one is a combustible fuel-air mixture and the other body contains at least some air, the combination of: a first intake manifold of relatively large cross-section in communication with said cylinder through said intake valve means opening into said cylinder; a flow control valve in said intake manifold in close proximity to said intake valve means; two additional intake manifolds of relatively small cross-section, one of which communicates substantially tangentially with said cylinder through said intake valve means, and the other of which communicates substantially axially with said cylinder through said intake valve means; flow throttling means in each of said three intake manifolds to control the density of the working fluid supplied to said cylinder through said manifolds; means for supplying said fuel-air mixture to said large manifold and one of said manifolds of relatively small cross-section; means to supply said working fluid containing air to the other of said manifolds of relatively small cross-section; a first control means to open and close said throttling means and said flow control valve in said first manifold substantially in unison; a second control means to open the throttling means in said small manifold supplied with fuel-air mixture first, and then said throttling means in said large manifold secondly, in sequence; and a third control means to open the throttling means in said other manifold of small cross-section supplied with working fluid containing air which operates in combination with said second control means, whereby said throttling means opened by said third control means is opened as said second control means opens the throttling means connected thereto in sequence.

References Cited
UNITED STATES PATENTS

| | | | |
|---|---|---|---|
| 1,643,396 | 9/1927 | Trussell | 123—75 |
| 1,766,854 | 6/1930 | Trussell | 123—52 |
| 1,955,661 | 4/1934 | Waldo | 123—52 |
| 2,230,740 | 2/1941 | Birkigt | 123—52 |
| 2,242,990 | 5/1941 | Brown | 123—75 |
| 3,211,137 | 10/1965 | Love | 123—75 |

WENDELL E. BURNS, *Primary Examiner.*